United States Patent [19]

Morrison

[11] 3,895,107

[45] July 15, 1975

[54] CSA AND CSC IN MAN AND MAMMALS TO INHIBIT ATHEROSCLEROSIS AND THE RECURRENCE OF CARDIOVASCULAR INCIDENTS IN ATHEROSCLEROTIC MAMMALS

[76] Inventor: Lester M. Morrison, Hollywood, Calif.

[22] Filed: Jan. 17, 1972

[21] Appl. No.: 218,550

Related U.S. Application Data

[63] Continuation-in-part of Ser. No. 28,928, April 15, 1970, abandoned, which is a continuation-in-part of Ser. No. 606,020, Dec. 30, 1966, abandoned.

[52] U.S. Cl. .............................................. 424/180
[51] Int. Cl.$^2$ ......................................... A61K 27/00
[58] Field of Search ................................... 424/180

[56] References Cited
UNITED STATES PATENTS

| | | | |
|---|---|---|---|
| 1,950,100 | 3/1934 | Crandell | 424/183 |
| 3,405,120 | 10/1968 | Kuwano | 424/180 |

OTHER PUBLICATIONS

Morrison (1), PSEBM Vol. 113, June 1963, page 362–366.
Morrison (2), Biol. Abst. Vol. 47, Dec. 15, 1966, Abst. No. 116245.
Morrison (3), PSEBM Vol. 123, Dec. 1966, pp. 904–911.
Murata–Die Naturwiss Vol. 49, No. 2, Jan. 1962, pages 39–40.
Mansuke et al., – Chem. Abst. Vol. 65 (1966), page 2880a.
Matsuoka et al., – Chem. Abst. Vol. 57, (1962), page 15745b.

*Primary Examiner*—Sam Rosen
*Attorney, Agent, or Firm*—Wills, Green & Mueth

[57] ABSTRACT

This patent describes a method of treatment for inhibiting the development of atherosclerotic lesions in animals of the mammalian species including man, promoting the development of collateral circulation in regions of the heart supplied by the branches of coronary arteries, and inhibiting the occurrence of cardiac episodes including myocardial infarctions, acute coronary insufficiency and acute myocardial ischemia in human subjects with ischemic or coronary heart disease, which comprises the essentially regular and prolonged oral administration to mammals of a biologically and physiologically "active" chondroitin sulfate which is "active" chondroitin sulfate A, "active" chondroitin sulfate C, and mixtures thereof, said activity being manifested by at least an 80% prolongation of plasma thrombusformation time 6 to 12 hours after administration in rabbits as described in the Chandler loop method.

9 Claims, No Drawings

CSA AND CSC IN MAN AND MAMMALS TO INHIBIT ATHEROSCLEROSIS AND THE RECURRENCE OF CARDIOVASCULAR INCIDENTS IN ATHEROSCLEROTIC MAMMALS

This application is a continuation-in-part of Ser. No. 28,928, filed Apr. 15, 1970, now abandoned, which application in turn was a continuation-in-part of Ser. No. 606,020, filed Dec. 30, 1966, and now abandoned.

Chondroitin sulfates A and C are widely distributed in human and animal tissues, particularly in cartilage and other connective tissues, and although complexed with protein or peptide residues, the pure acid mucopolysaccharides can be isolated without undergoing appreciable degradation. Chondroitin sulfates A and C both contain D-glucuronic acid, 2-amino-2-deoxy-D-galactose and acetyl and sulfate residues in equimolar quantities. Structural investigations have shown that chondroitin sulfates A and C differ only in the position of the sulfate ester grouping in the hexosamine residue. Chondroitin sulfate A contains the repeating unit, $(1 \rightarrow 4)$-O-$\beta$-D-glucopyranosyluronic acid-$(1 \rightarrow 3)$-2-acetamido-2-deoxy-4-O-sulpho-$\beta$-D-galactopyranose, and chondroitin sulfate C the repeating unit, $(1 \rightarrow 4)$-O-$\beta$-D-glucopyranosyluronic acid-$(1 \rightarrow 3)$-2-acetamido-2-deoxy-6-O-sulpho-$\beta$-D-galactopyranose. It has now been found that purified preparations of chondroitin sulfate A of apparently similar chemical composition as judged by ordinary methods of analysis may differ significantly in pharmacologic and physiologic activity. Similar findings were obtained in respect to purified preparations of chondroitin sulfate C.

The present invention is distinguished from the prior art in the following principal respects. First, until recently it was not appreciated that CSA and CSC could be obtained in a unique form which was "active" in preventing atherosclerosis and the recurrence of cardiovascular incidents in atherosclerotic mammals when administered on a regular basis over a prolonged period. This "active" material is to be contrasted with the material described in U.S. Pat. No. 3,405,120 which has been tested and found to be inactive in prolonging plasma thrombus-formation time 6 to 12 hours after administration in rabbits as described in the Chandler loop method and in preventing atherosclerosis in rats fed the atherogenic diet hereinafter described. In general, the prior art as illustrated by U.S. Pat. No. 1,950,100 has contained no recognition of differences in the anti-atherosclerotic activity of different preparations of CSA and CSC of apparent similar chemical composition. This discovery of the present invention is believed to represent a major advance in the art.

Secondly, the present invention involves essentially regular and prolonged administration and, hence, is limited to more or less periodic administration on a daily basis over a period of at least several months and more typically, over a period of at least several years. Obviously, occasional interruptions in this program of administration are of no significance, so long as the program of administration is regular, viewed in the overall. Those skilled in the art will readily recognize the difference between essentially regular and prolonged usage as compared to erratic, occasional, or short term usage, the latter of which does not form any part of this invention.

SUMMARY OF THE INVENTION

Briefly, the present invention comprises a method of treatment for inhibiting the development of atherosclerotic lesions in animals of the mammalian species including man, promoting the development of collateral circulation in regions of the heart supplied by the branches of coronary arteries, and inhibiting the occurrence of cardiac episodes including myocardial infarctions, acute coronary insufficiency and acute myocardial ischemia in human subjects with ischemic heart disease, which comprises the essentially regular and prolonged oral administration to mammals of a biologically and physiologically "active" chondroitin sulfate which is "active" chondroitin sulfate A, "active" chondroitin sulfate C, and mixtures thereof, said activity being manifested by a prolongation of plasma thrombus-formation time 6 to 12 hours after administration in rabbits as described in the Chandler loop method.

It is an object of this invention to inhibit the development of atherosclerotic lesions in mammals.

It is another object to promote the development of collateral circulation in regions of the heart supplied by branches of coronary arteries.

Yet another object of this invention is to inhibit the occurrence of cardiac episodes such as myocardial infarctions, acute coronary insufficiency and acute myocardial ischemia in human subjects having ischemic or coronary heart disease.

These and other objects and advantages of this invention will be apparent from the following detailed description of this invention.

DESCRIPTION OF THE PREFERRED EMBODIMENTS

The treatment with CSA and CSC comprises the administration of the compound orally by the ingestion of 0.5 g. to 10 g. daily, usually one-third of the daily dosage being taken before or after each meal. The duration time of the treatment ranges from a short term (approximately 3 months) to continuous administration for the patient's lifetime.

I have found that considerable variation exists in the plasma thrombus-formation time of different batches of chondroitin sulfate A 12 hours after intravenous administration despite the fact that on the basis of the following standard tests they are indistinguishable:

| Test | Method | Range |
|---|---|---|
| Nitrogen | Kjeldahl | 2.5 to 3.5% |
| Sulfur | Schoniger | 5 to 6% |
| Optical rotation | U.S.P. XVII, Page 911 | $(a)_D^{24} = -23°$ to $-25°$ |
| pH of 1% solution | Conventional | pH 6 to pH 7 |
| Residue on ignition | U.S.P. XVII, Page 885 | Less than 3% |
| Hexosamine | Elson-Morgan* | 32 to 35% |
| Hexuronic acid | Dische (Carbazole)* | 36 to 39% |
| Specific Viscosity 1% | Oswald | 10 cps |
| Color (20% solution) | Our own specifications** | Less than 0.2 optical density |
| Pyrogen | U.S.P. XVII, Page 863 | Pass |
| Sterility | U.S.P. XVII, Page 829 | Pass |
| Heavy metals | U.S.P. XVII, Page 877 | Less than 20 ppm |

-Continued

| Test | Method | Range |
| --- | --- | --- |

*Methods of Enzymology, Volume III, Edited by Sidney P. Colowick and Nathan O. Kaplan, Academic Press, New York, 1957, pp. 93–101.
**Optical density is determined at 420 mμ on a Beckman Jr. Model B Spectrophotometer.

None of the foregoing tests distinguish biologically and physiologically "active" CSA and biologically and physiologically active CSC from inactive material. The biological and physiological activity of the CSA and CSC can be determined as follows. When assayed for biologic and physiologic activity in prolonging plasma thrombus-formation time by the Chandler loop method as modified by Morrison et al. (J. Atheroscler. Res., 8:319, 1968), preparations of purified chondroitin sulfate A which were comparable as judged by the above battery of tests resulted in the following average plasma thrombus-formation times of rabbits when assayed 12 hours post-injection:

| Sample tested | Average plasma thrombus-formation time 12 hours post-injection |
| --- | --- |
| | minutes |
| Physiologic saline solution | 12.2 |
| CSA, lot No. A-6 | 49.6 |
| CSA, lot No. A-10 | 46.4 |
| CSA, lot No. B-3 | 14.1 |
| CSA, lot No. B-7 | 16.7 |
| CSA, lot No. B-9 | 31.6 |
| CSA, lot No. C-1 | 52.1 |
| CSA, lot No. C-2 | 13.6 |
| CSA, lot No. C-4 | 18.1 |
| CSA, lot No. W-2101 | 15.2 |
| CSA, lot No. W-164 | 22.8 |

The tests were conducted with New Zealand white male rabbits ranging from 4½ to 5½ lbs. in body weight. The plasma thrombus-formation time was determined for each animal prior to injection and again 12 hours post-injection. The chondroitin sulfate A was dissolved in physiologic saline solution and diluted to a concentration of 80 mg/ml. The physiologic saline solution controls and the rabbits administered the chondroitin sulfate A solutions were administered the above solutions intravenously in the ear vein at a level of 1 ml per kg of body weight. A minimum of six rabbits was employed in each group. Injections of physiologic saline solution caused no significant change in plasma thrombus-formation times over pre-injection levels when blood samples were taken 12 hours after injection. As indicated in the above table, however, a number of chondroitin sulfate A preparations resulted in a highly significant increase in plasma thrombus-formation times 12 hours post-injection over that of saline-injected controls whereas others had little if any activity in this regard. It is of interest that heparin which is extremely active in prolonging plasma thrombus-formation time in blood samples taken 15 minutes after intravenous injection does not result in a prolongation of plasma thrombus-formation time in blood samples taken 6 to 12 hours after injection. Samples of chondroitin sulfate A which result in a marked prolongation of plasma thrombus-formation time in blood samples taken 12 hours after injection were found, however, to have no significant effect in prolonging plasma thrombus-formation time over pre-injection levels in blood samples taken 15 minutes after injection.

It has also been found that in the case of chondroitin sulfate C purified preparations of this material which were similar on the basis of the chemical tests indicated above varied markedly in activity in prolonging the plasma thrombus-formation time of rabbits in blood samples taken 12 hours post-injection.

In general, preparations of purified chondroitin sulfate A, purified chondroitin sulfate C, or combinations of the two which result in at least an 80% increase in the plasma thrombus-formation time of rabbits 12 hours post-injection under the conditions indicated above compared to values in saline-injected controls are "active" in inhibiting or preventing the occurrence of atherosclerosis. No claim is made that the plasma thrombus-prolonging activity of such preparations following intravenous administration is related to the anti-atherogenic activity obtained following oral administration. The thrombus-prolonging assay is merely used as a screening device for detecting preparations with anti-atherogenic activity. It has been observed that every preparation of purified chondroitin sulfate A or C or combinations of the two that had anti-atherogenic activity under the conditions indicated below were also active in prolonging the plasma thrombus-formation time of rabbits 12 hours post-injection by a value at least 80% greater than that of saline-injected controls. Findings also indicate that preparations that were most active in prolonging the plasma thrombus-formation time of rabbits under the above test conditions were also the most active in anti-atherogenic activity. In contrast, preparations of purified chondroitin sulfate A and/or C that had little if any anti-atherogenic activity were invariably those that failed to prolong the plasma thrombus-formation time of rabbits to a significant degree over that of saline-injected controls under the conditions indicated above.

Differences in the activity of different preparations of purified chondroitin sulfate A and C can result both from differences in the method of preparation and differences in the starting material. I have observed that samples of purified chondroitin sulfate A prepared from the same starting material differed significantly in respect to their effect on plasma thrombus-formation time 12 hours post-injection depending on the method employed in preparing chondroitin sulfate A. I have also observed that methods that resulted in highly active materials by the above assay procedure when applied to some starting materials resulted in inactive preparations when applied to other starting materials, despite the fact that differences in the various preparations could not be demonstrated by the battery of chemical tests indicated above.

An experimental model for the induction of atherosclerosis in the aorta and coronary arteries of rats has been developed and consists of feeding young rats for 6 weeks a purified, cholesterol-containing diet supplemented with 1.25 million U.S.P. units of vitamin $D_2$ (Viosterol) per kg of ration. Rats fed a similar diet with either cholesterol or the 1.25 million U.S.P. units of vitamin $D_2$ omitted, did not show such lesions. The distribution and microscopic appearance of such lesions is very similar to that observed in human subjects with atherosclerotic lesions in these tissues. It has been found that the oral administration of purified preparations of chondroitin sulfate A and C or combinations of the two which are active in prolonging the plasma thrombus-formation time of rabbits as indicated above are highly active in reducing or preventing the occurrence of atherosclerotic lesions on the atherogenic diet indicated above.

The following provides a description of the experimental conditions employed in inducing atherosclerosis and the results obtained with a biologically and physiologically "active" preparation of purified chondroitin sulfate A.

The basal ration employed was a highly purified diet consisting of sucrose, 61%; Vitamin-Free Test Casein, 24%; cottonseed oil, 10%; Hubbell, Mendel and Wakeman Salt Mixture, 5%; and the following vitamins per kg. of diet: thiamine hydrochloride, 10 mg; riboflavin, 10 mg; pyridoxine hydrochloride, 10 mg; calcium pantothenate, 60 mg; nicotinic acid, 100 mg; ascorbic acid, 200 mg; biotin, 1 mg; folic acid, 10 mg; paraaminobenzoic acid, 200 mg; inositol, 400 mg; vitamin $B_{12}$, 150 micrograms; 2-methyl-1,4-naphthoquinone, 5 mg; choline chloride, 2 gm; vitamin A, 5,000 U.S.P. units; vitamin $D_2$, 500 U.S.P. units; and alpha-tocopherol acetate, 100 mg. The vitamins were added in place of an equal amount of sucrose. Fifty-four male rats of the Long-Evans strain averaging 145 gm in body weight (range 136 to 155 gm) and 54 female rats of the Long-Evans strain averaging 146 gm in body weight (range 138 to 156 gm) were selected for the following experiment:

Animals were divided into five groups of comparable weight. Groups I, II and III consisted of six animals of each sex; groups IV and V consisted of 18 animals of each sex. Group I was fed the basal ration indicated above; group II was fed the basal ration +1% purified chondroitin sulfate A (lot No. 9008). The latter preparation resulted in a plasma thrombus-formation time of 48.8 minutes 12 hours post-injection in rabbits in contrast to an average thrombus-formation time of 13.2 minutes in saline-injected controls, when tested under the conditions described previously. Group III was fed the basal ration + 1.5% cholesterol + 0.5% cholic acid. Group IV was fed the basal ration + 1.5% cholesterol + 0.5% cholic acid + 1.25 million U.S.P. units of vitamin $D_2$ per kg of diet; Group V was fed the same diet as group IV but in addition received a supplement of 1% purified chondroitin sulfate A (lot No. 9008). The test supplements were incorporated in the basal ration in place of an equal amount of sucrose. Animals were kept in metal cages with raised screen bottoms (three rats per cage) and were provided the various diets and water ad libitum. The animals were fed daily and all food not consumed 24 hours after feeding was discarded. The rats were weighed weekly during the course of the experiment.

After 6 weeks of feeding, the rats were anesthetized with sodium pentobarbital, and blood was withdrawn from the heart into a heparinized syringe. Livers were excised, blotted to remove excess blood, weighed and stored in a freezer until anaylyed. Lipid was extracted from the livers by the method of Thompson et al. (Brit. J. Nutrition, 3: 50, 1949), and total and free cholesterol were determined on liver and plasma by a modification of the method of Schoenheimer and Sperry as reported by Nieft and Deuel (J. Biol. Chem., 177: 143, 1949). At necropsy the hearts and aorta were fixed in 10% buffered formalin. The hearts were divided into three parts consisting of the apex, middle and basal portion; and the aortas were cut transversely at the arch and the mid-thoracic level. Frozen sections of the above were prepared, cut at 16–20 micra in thickness and stained with Oil-Red-O for the demonstration of lipid and counterstained with hematoxylin. Ten cross sections were prepared through each part of the heart and through the arch and thoracic portions of the aorta. The slides were examined under a microscope and graded for the incidence and severity of atherosclerotic lesions.

The incidence and distribution of atherosclerotic lesions in the coronary arteries and aorta of rats in the various groups are summarized in Table I.

Table I

Effects of an "active" chondroitin sulfate A preparation on the incidence and distribution of atherosclerotic lesions in the coronary arteries and aorta of rats fed a hypervitaminosis D atherogenic diet.

|  | Non-Atherogenic Diets | | | Atherogenic Diets | |
|---|---|---|---|---|---|
|  | Group I | Group II | Group III | Group IV | Group V |
| Male rats |  |  |  |  |  |
| Number of animals per group | 6 | 6 | 6 | 18 | 18 |
| Initial body weight, gm. | 145.3 | 145.3 | 145.3 | 145.6 | 145.6 |
| Final body weight*, gm. | 362.0 | 365.7 | 371.5 | 131.1 | 158.9 |
| Histological findings |  |  |  |  |  |
| Coronary atherosclerosis |  |  |  |  |  |
| Incidence, % | 0.0 | 0.0 | 0.0 | 100.0 | 16.7 |
| Average number of arteries affected per rat in following parts of heart: |  |  |  |  |  |
| Basal | 0.0 | 0.0 | 0.0 | 4.2 | 0.5 |
| Middle | 0.0 | 0.0 | 0.0 | 3.5 | 0.1 |
| Apical | 0.0 | 0.0 | 0.0 | 2.4 | 0.2 |
| Aortic atherosclerosis |  |  |  |  |  |
| Incidence, % | 0.0 | 0.0 | 0.0 | 94.4 | 0.0 |
| Percentage of animals per group showing lesions in the following parts of the aorta and score per affected rat: |  |  |  |  |  |
| Intracardiac | 0.0 | 0.0 | 0.0 | 44.4 (2.0)** | 0.0 |
| Arch | 0.0 | 0.0 | 0.0 | 88.9 (2.1)** | 0.0 |
| Mid thoracic | 0.0 | 0.0 | 0.0 | 66.7 (1.3)** | 0.0 |
| Female rats |  |  |  |  |  |
| Number of animals per group | 6 | 6 | 6 | 18 | 18 |
| Initial body weight, gm. | 146.5 | 146.5 | 146.5 | 146.5 | 146.5 |
| Final body weight*, gm. | 240.8 | 229.3 | 259.6 | 110.3 (16)*** | 138.2 |

Table I—Continued

Effects of an "active" chondroitin sulfate A preparation on the incidence and distribution of atherosclerotic lesions in the coronary arteries and aorta of rats fed a hypervitaminosis D atherogenic diet.

| | Non-Atherogenic Diets | | | Atherogenic Diets | |
|---|---|---|---|---|---|
| | Group I | Group II | Group III | Group IV | Group V |
| Histological findings | | | | | |
| Cornary atherosclerosis | | | | | |
|   Incidence, % | 0.0 | 0.0 | 0.0 | 100.00*** | 16.7 |
|   Average number of arteries affected per rat in following parts of the heart: | | | | | |
|     Basal | 0.0 | 0.0 | 0.0 | 2.7 | 0.2 |
|     Middle | 0.0 | 0.0 | 0.0 | 2.8 | 0.1 |
|     Apical | 0.0 | 0.0 | 0.0 | 2.7 | 0.0 |
| Aortic atherosclerosis | | | | | |
|   Incidence, % | 0.0 | 0.0 | 0.0 | 100.0*** | 27.8 |
|   Percentage of animals per group showing lesions in the following parts of the aorta and score per affected rat: | | | | | |
|     Intracardiac | 0.0 | 0.0 | 0.0 | 87.5 (2.0)** | 27.8 (1.2)** |
|     Arch | 0.0 | 0.0 | 0.0 | 100.0 (2.7)** | 27.8 (1.2)** |
|     Mid thoracic | 0.0 | 0.0 | 0.0 | 93.8 (1.6)** | 11.1 (1.5)** |

*The experiment was terminated after 6 weeks of feeding.
**The severity of lesions was evaluated on the basis of a scale ranging from 0 to 4.
***Two of the rats in this group died during the course of the experiment. Data in this group are based on the surviving 16 animals in this group.

Findings indicate that the oral administration of a biologically "active" preparation of chondroitin sulfate A at a 1% level in the diet caused a highly significant reduction in the incidence and severity of atherosclerotic lesions in the coronary arteries and aorta of rats fed a hypervitaminosis D atherogenic diet. Additional studies conducted with a biologically "active" preparation of chondroitin sulfate C indicate that the latter material was similarly active in this regard. In contrast, preparations of purified chondroitin sulfate A and C which were similar to the above preparations in respect to chemical composition by the tests indicated previously but which were "inactive" in respect to prolonging the plasma thrombus-formation time of rabbits as determined by the Chandler loop method in blood samples taken 12 hours post-injection, such samples had little if any activity in reducing the incidence and severity of atherogenic lesions under the test conditions indicated above.

An additional finding and one that appears to be unique in respect to forms of medication attributed to have anti-atherogenic activity is that the anti-atherosclerotic activity of "active" preparations of chondroitin sulfate A and C is not associated with any detectable effect of these preparations in lowering of plasma and liver cholesterol and liver total lipid levels. The increase in plasma and liver cholesterol and liver total lipids in rats fed the hypervitaminosis D atherogenic diet supplemented with 1% of an "active" preparation of chondroitin sulfate A or C was just as marked in rats fed the latter supplements compared to that of rats fed the basal non-atherogenic diet as it was in rats fed the atherogenic diet with the chondroitin sulfate A and C omitted.

The effectiveness of biologically "active" preparations of chondroitin sulfate A and C in promoting the development of collateral circulation in regions of the heart supplied by branches of the coronary arteries is shown by the following data.

Rats were fed the atherogenic diet (group IV) indicated above (i.e., the basal ration supplemented with 1.5% cholesterol, 0.5% cholic acid and 1.25 million U.S.P. units of vitamin $D_2$ per kg of diet). These rats showed a significant reduction in the number of branch coronary arteries as determined by actual count of the branch coronary arteries in cross-sections in all three parts of the heart (i.e., basal, middle and apical portions) compared to that of rats fed the non-atherogenic diets (groups I, II and III). This effect pertained to the branch coronary arteries not the main coronary arteries. When rats were fed the atherogenic diet indicated above but in addition were fed an "active" preparation of chondroitin sulfate A at a 1% level in the diet (group V), the number of branch coronary arteries was increased to levels approaching that of rats fed the non-atherogenic diets (groups I, II and III). Similar findings were observed in both male and female rats. Results are summarized in Table II below.

Table II

Effects of an "active" chondroitin sulfate A preparation on the number of branch coronary arteries of rats fed a hypervitaminosis D, atherogenic diet.*

| Dietary group | No. of Animals per group | Average number of coronary arteries per cross section in following parts of the heart: | | | | | |
|---|---|---|---|---|---|---|---|
| | | Basal section | | Middle section | | Apical section | |
| | | Main | Branches | Main | Branches | Main | Branches |
| Male rats | | | | | | | |
| Non-atherogenic diets | | | | | | | |
|   Group I | 6 | 4.7 | 25.3 | 6.0 | 31.6 | 3.8 | 26.0 |
|   Group II | 6 | 5.3 | 28.2 | 6.5 | 33.0 | 4.5 | 28.0 |
|   Group III | 6 | 3.5 | 23.0 | 5.0 | 27.5 | 3.8 | 23.0 |
| Atherogenic diets | | | | | | | |
|   Group IV | 18 | 3.7 | 14.8 | 5.5 | 20.0 | 3.3 | 15.6 |
|   Group V | 18 | 4.8 | 20.9 | 5.7 | 27.3 | 3.6 | 22.8 |

Table II—Continued

Effects of an "active" chondroitin sulfate A preparation on the number of branch coronary arteries of rats fed a hypervitaminosis D, atherogenic diet.*

| Dietary group | No. of Animals per group | Average number of coronary arteries per cross section in following parts of the heart: | | | | | |
|---|---|---|---|---|---|---|---|
| | | Basal section | | Middle section | | Apical section | |
| | | Main | Branches | Main | Branches | Main | Branches |
| Female rats | | | | | | | |
| Non-atherogenic diets | | | | | | | |
| Group I | 6 | 5.2 | 20.0 | 5.2 | 28.3 | 4.2 | 25.3 |
| Group II | 6 | 4.0 | 25.3 | 5.7 | 32.5 | 3.3 | 26.2 |
| Group III | 6 | 4.3 | 27.7 | 5.0 | 30.0 | 4.0 | 25.5 |
| Atherogenic diets | | | | | | | |
| Group IV | 18 | 3.2 | 11.7 | 4.8 | 18.0 | 3.2 | 14.5 |
| Group V | 18 | 4.0 | 21.4 | 5.6 | 29.1 | 4.1 | 22.1 |

*The experiment was terminated after 6 weeks of feeding.

It would appear that under the conditions of the above experiment in which a reduction occurred in the number of branch coronary arteries of rats fed an atherogenic diet, the concurrent administration of an "active" preparation of chondroitin sulfate A at a 1% level in the diet resulted in a highly significant increase in the number of branch coronary arteries. To the extend that an increased number of branch coronary arteries in a particular region of the heart would be associated with increased circulation in that part of the heart, it would appear that "active" preparations of chondroitin sulfate A would be active in promoting the development of collateral circulation in regions of the heart supplied by branches of the coronary arteries. Additional studies indicate that "active" preparations of chondroitin sulfate C were similarly active in this regard whereas preparations of purified chondroitin sulfate A and C that were "inactive" in prolonging the plasma thrombus-formation time of rabbits under the test conditions indicated previously were without activity in preventing the reduction in the number of branch coronary arteries of rats fed a hypervitaminosis D, atherogenic diet.

The effectiveness of "active" preparations of chondroitin sulfate A and C in preventing the occurrence of cardiac episodes (including myocardial infarctions, acute coronary insufficiency and acute myocardial ischemia) in human subjects with ischemic coronary heart disease is shown by the following results.

The term "ischemic coronary disease" (ICD) as employed herein describes insufficiency of blood flow to the myocardium. It denotes not only the presence of coronary artery disease ("silent" atherosclerosis involves the coronary arteries in the majority of North American adults) but progression of the atherosclerosis process to the stage of a clinically and/or electrocardiographically demonstrable abnormality. One hundred and twenty patients with ischemic coronary disease as determined by electrocardiograms plus clinical history including angina pectoris and/or past myocardial infarctions, who had been treated for these conditions during periods varying from 6 months to 20 years, were divided into two groups of 60 patients each, matched as closely as possible for age, sex, and clinical and laboratory findings. A comparison of the two groups is given in Table III.

Both groups of patients were randomly selected as they

Table III

| | Condition of 60 CSA-Treated Ischemic Coronary Disease Patients and 60 Control Patients Prior to study | | | | | |
|---|---|---|---|---|---|---|
| | AVERAGE AGE | ANGINA | PREVIOUS MYOCARDIAL INFARCTION | HYPERTENSION | RECEIVING ANTI-COAGULANT THERAPY | TOTAL NO. OF PATIENTS |
| | (years) | (No.) | (No.) | (No.) | (No.) | (No.) |
| MALES: | | | | | | |
| CSA | 66 | 15 | 7 | 6 | 6 | 16 |
| Controls | 66 | 19 | 12 | 8 | 7 | 25 |
| FEMALES: | | | | | | |
| CSA | 64 | 25 | 6 | 20 | 3 | 44 |
| Controls | 67 | 20 | 3 | 19 | 3 | 35 |
| ALL: | | | | | | |
| CSA | 65 | 40 | 13 | 26 | 9 | 60 |
| Controls | 66 | 39 | 15 | 27 | 10 | 60 | presented themselves in clinical practice in alternate fashion. All pre-test comprehensive therapeutic regimens were continued or expanded. Included were low-sodium, low-cholesterol diets, restricted sugar intake where indicated, coronary artery, cerebral artery or peripheral artery vasodilators, sedatives, oral anticoagulants, vitamin and/or nutritional supplements (including highly unsaturated oils and fats), thyroid extract and female sex hormones. The two groups differed in only one respect. Subject in group II were administered an "active" preparation of chondroitin sulfate A daily. Those in group I were not. During the first year of the study subjects in group II were given 1.5 to 10 gm of an "active" chondroitin sulfate A preparation daily, initially in powder form, and later in the form of tablets containing 0.5 gm of purified chondroitin sulfate A per tablet. During the second and third years of the study the dosage of "active" chondroitin sulfate A administered was either 1.5 gm or 3 gms per day in tablet form.

The chondroitin sulfate A was prepared from bovine tracheal cartilage. Each batch of chondroitin sulfate A was tested for plasma thrombus-prolongation activity as indicated previously and only those preparations which were "active" as judged by this bioassy procedure were employed for test purposes.

Laboratory test for the hemopoietic, hepatic, renal and other systems were made in both groups of patients and in group II these tests were usually conducted every 1 to 2 months over the first 2-year period, then every 4 months during the third year of the treatment study period. These tests were: complete blood count, sedimentation rate, urinalysis, protein bound iodine, $I^{131}$ labeled triiodothyronine, sodium, potassium, thymol turbidity, serum glutamic oxalacetic transaminase, serum glutamic pyruvic transaminase, serum bilirubin — direct and indirect, calcium, phosphorus, creatinine, glucose, total protein, albumin, globulin, urea nitrogen, uric acid, alkaline phosphatase, cephalin flocculation, cholesterol and beta-lipoprotein.

In addition, chest x-rays and resting electrocardiograms were made in each patient; Master exercise electrocardiograms were taken in most patients, ophthamlmologic examinations were conducted by qualified ophthalmologists in all cases; photographs of the microcirculation in the conjunctival vessels were made in 27 patients.

Coronary risk factors such as obesity, hypercholesteremia, hyperlipema, hyperbetalipoproteinemia, hypertension, tobacco intake, diabetes mellitus were of approximately equal incidence in both groups of patients, with no preponderance of any of the above factors having been noted in either group.

No deleterious effects attributed to chondroitin sulfate A administration either clinically or on the basis of laboratory findings were observed in any of the subjects over the 3-year period of observation.

Table IV indicates details of mortality and morbidity in the 120 patients studied over the 3-year period of investigation.

"acute coronary insufficiency" or "impending myocardial infarction," each patient was first admitted and treated in an acute coronary care unit of a general hospital. Of the 6 fatal myocardial infarction cases, 4 were males aged 76, 71, 65 and 56 respectively; the two fatal myocardial infarction female patients were aged 65 and 79 respectively. Three patients died during the first year of observation, the others died during the remaining 2 years of observation and treatment of the general therapeutic regime described above. Of the 6 cases of myocardial infarction (fatal), 4 patients had a history of chronic angina pectoris.

There were 8 patients who survived myocardial infarctions, 2 of these having two incidents each, so that there were 10 incidents of non-fatal myocardial infarction. Of these 8 patients, 5 were males and 3 were females. Their ages ranged from 49 years to 83 years, with an average of 68 years. None received anticoagulant therapy prior to the attack. Five patients had a previous myocardial infarction.

There were 8 incidents (7 patients, 1 twice) of acute coronary insufficiency. All of these patients were admitted to the acute coronary care units of hospitals, some with the admitting physician's diagnoses of "threatened" or "impeding" myocardial infarction, of "protracted angina pectoris" or "status anginosus." All 7 patients recovered from the acute coronary insufficiency, but 2 patients subsequently suffered massive myocardial infarctions, one 12 months later (non-fatal) and the other 21 months later (fatal). The former of these 2 patients was hospitalized twice for acute coronary insufficiency.

Five patients with myocardial ischemia were hospi-

Table IV

Acute Cardiac Incidents Occurring in 60 CSA-Treated Patients and 60 Control Patients with Ischemic Coronary Disease During a Three-Year Study Period

| | MYOCARDIAL FATAL | INFARCTIONS NON-FATAL | ACUTE CORONARY INSUFFICIENCY* | MYOCARDIAL ISCHEMIA** | TOTAL |
|---|---|---|---|---|---|
| MALE: | | | | | |
| CSA | 2 | 0 | 0 | 0 | 2 |
| Controls | 4 | 6 | 4 | 0 | 14 |
| FEMALE: | | | | | |
| CSA | 1 | 0 | 1+ | 0 | 2 |
| Controls | 2 | 4 | 4 | 5 | 15 |
| ALL: | | | | | |
| CSA | 3 | 0 | 1+ | 0 | 4 |
| Controls | 6 | 10 | 8 | 5 | 29 |

*Hospitalized
**Hospitalized and transient
+Fatal

In Group I of the 60 patients who did not receive CSA the following acute cardiac incidents occurred:
1. Myocardial Infarctions — fatal = 6 incidents
2. Myocardial Infarctions — non-fatal = 10 incidents
3. Acuto Coronary Insufficiency or Acute Myocardial Ischemia (non-fatal) = 8 incidents
4. Myocardial Ischemia (non-fatal) = 5 incidents All patients listed above were hospitalized with the exception of two fatal cases of myocardial infarction who were diagnosed by an attending physician other than the author and described as such on death certificates. In the patients diagnosed in the hospital as talized for distressing symptoms referable to their cardiovascular system. However, these were not sufficiently severe and the ECG and blood enzyme changes were not critical enough to required admission to an acute coronary care unit; these patients were consequently kept on the general hospital patient car services for treatment. All five patients were females; ages ranged from 55 years to 75 years, with an average of 65 years.

In Group II, of the 60 CHD patients who received active CSA the following acute cardiac incidents occurred:

1. Myocardial Infarction — fatal = 3 incidents
2. Myocardial Infarction — non-fatal = 0 incidents
3. Acute Coronary Insufficiency (terminal) = 1 incident
4. Myocardial Ischemia = 0 incidents Two of the fatal myocardial infarction patients were males and the third was a female, at ages 68, 77 and 65 respectively.

In the first fatal myocardial infarction patient, in whom an autopsy was performed, CSA had been discontinued for 2 months prior to death. The second patient in this category had taken CSA intermittently for 1 year, then had discontinued it for 1 year prior to death. The third patient (female) who suffered a fatal myocardial infarction had persistent hypertension which frequently was difficult or impossible to control. In the female patient who died with a terminal coronary insufficiency and cardiac congestive failure, these were the terminal complications following a massive cerebrovascular hemorrhage in a patient with chronic fibrillation and flutter. Three of these four patients had a history of chronic angina pectoris.

Some patients in the CSA treated group underwent frequent periods of brief interruption of CSA medication, due to shortages of supply, intermittent upper respiratory or gastrointestinal "influenzal" infections or food upset episodes. These were of short duration, lasting from several days to at most several weeks.

To date no other cardiac incidents have occurred in the 60 CSA treated patients other than the above 4 patients. Strictly speaking, two of these four patients might not be considered valid cases of failure of CSA to prevent an acute cardiac accident since in one incident (fatal myocardial infarction in the 77 year old male) the patient had discontinued taking CSA 1 year prior to death and in a second, the patient actually expired from a massive cerebrovascular accident in which the cardiac failure occurred as a complicating terminal event.

One other patient in this group was lost due to death; autopsy revealed a malignant cerebral astrocytoma in a female patient aged 62. This patient already had cerebral symptoms when CSA therapy was begun, having undergone two hospital admissions for diagnostic cerebral and general neurologic examinations. These failed to disclose the cerebral lesion which was revealed subsequently at pre-mortem surgery and autopsy.

In the 60 control patients, there was a total of 29 cardiac incidents over the 3-year period of observation in contrast to a total of 4 cardiac incidents in a comparable group of patients administered daily oral doses of an "active" preparation of chondroitin sulfate A.

PREPARATION OF "ACTIVE" CSA

One starting material for the preparation of "active" chondroitin sulfate A is bovine trachea. This material is obtained from the slaughter houses as soon as possible after the animals are slaughtered. It is then frozen until processed. In processing, it is trimmed free of tissue and finely ground. This ground tissue is defatted with five parts of acetone. Two extractions are made to reduce the fat content to approximately 1% or less. The defatted material is dried and re-ground. A 5% solution of the latter is made up in a 0.1 M calcium acetate buffer containing 1% papain plus 0.005 M cystein hydrochloride and 0.005 M disodium versenate as enzyme activators. The entire mixture is maintained at 62°C ± 3°C for 24 to 30 hours with gentle stirring. Approximately 85 to 95% solubilization of the trachea is obtained. This supernatant is decanted and is precipitated with two volumes of acetone. The acetone supernatant is decanted. The remaining precipitated material is dissolved in isotonic saline to make a solution of 3–5%. To the latter is added a saturated solution of potassium permanganate in 2 to 5 ml. portions with constant stirring, adding each portion until the purple color has been totally discharged. Depending on the various raw materials started with, this may take anywhere from 50 to 200 ml. of potassium permanganate solution per 6 lbs. of starting raw material. When at the interval between addition and discharge, the color becomes long (sic) (more than 5 minutes), no further permanganate is added. The solution is then allowed to stand overnight to permit flocculation of the manganese dioxide and completion of any reactions. The manganese dioxide is removed either by centrifugation or filtration through a coarse filter paper. The maganese dioxide cake is washed with additional isotonic saline. In some cases the addition of a small amount of formaldehyde or methanol will cause flocculation of manganese dioxide which is then precipitated with one volume of acetone. The resultant oily precipitate is collected by decantation, the solvent evaporated or the cake dissolved in a minimum amount of water and the final product obtained by lyophilization. It appears on paper chromatography to be essentially pure chondroitin sulfate A. Analysis of the product shows a typical chondroitin sulfate A infra-red spectrophotometric absorption curve. Optical rotation determinations give values of $(a)_D^{24} = -24°$; nitrogen content, 3.3%.

PREPARATION OF "ACTIVE" CSC

One starting material for the preparation of "active" chondroitin sulfate C is shark cartilage. This material obtained in a dry form is ground and defatted with three to five parts acetone. On extraction is usually sufficient. This extracted shark cartilage is then treated as indicated above for the dried bovine trachea after the defatting stage.

Having fully described the invention, it is intended that it be limited only by the lawful scope of the appended claims.

I claim:

1. The method of treatment for inhibiting the development of atherosclerotic lesions in animals of the mammalian species, promoting the development of collateral circulation in regions of the heart supplied by the branches of coronary arteries, and inhibiting the occurrence of cardiac episodes including myocardial infarctions, acute coronary insufficiency with acute myocardial ischemia in human subjects with ischemic heart disease, which comprises the essentially regular and prolonged oral administration to mammals of an effective amount of a biologically and physiologically "active" chondroitin sulfate A, "active" chondroitin sulfate C, or mixtures thereof, said activity being manifested by at least an 80% prolongation of plasma thrombus-formation time 6 to 12 hours after administration in rabbits as described in the Chandler loop method.

2. The method of claim 1 wherein the "active" chondroitin sulfate A is prepared from ground bovine trachea by:

1. treating a solution of the defatted and finely divided tissue with a papain enzyme to solubilize the bulk of the tissue,
2. precipitating the solubilized material with acetone,
3. contacting the precipitate solubilized in an aqueous solution with a permanganate oxidizing agent, and
4. recovering essentially pure active chondroitin sulfate A.

3. The method of claim 2 wherein the essentially pure CSA is recovered by evaporation.

4. The method of claim 2 wherein the essentially pure CSA is recovered by lyophilization.

5. The method of claim 1 wherein the "active" chondroitin sulfate C is prepared from ground shark cartilage by:
   1. treating a solution of the defatted and finely divided tissue with a papain enzyme to solubilize the bulk of the tissue,
   2. precipitating the solubilized material with acetone,
   3. contacting the precipitate solubilized in an aqueous solution with permanganate oxidizing agent, and
   4. recovering essentially pure active chondroitin sulfate C.

6. The method of claim 5 wherein the essentially pure CSC is recovered by evaporation.

7. The method of claim 5 wherein the essentially pure CSC is recovered by lyophilization.

8. The method of claim 1 wherein the drug is orally ingested in an amount of about 0.5 to 10 grams daily.

9. The method of treatment for inhibiting the development of atherosclerotic lesions in humans, promoting the development of collateral circulation in regions of the heart supplied by the branches of the coronary arteries, and inhibiting the occurrence of cardiac episodes including myocardial infarctions, acute coronary insufficiency and acute myocardial ischemia in human subjects with ischemic heart disease, which comprises the essentially regular and prolonged oral administration to human subjects of an effective amount of a biologically and physiologically "active" chondroitin sulfate A, "active" chondroitin sulfate C, or mixtures thereof, said activity being manifested by at least an 80% prolongation of plasma thrombus-formation time 6 to 12 hours after administration in rabbits as described in the Chandler loop method.

* * * * *